(12) United States Patent
Nakakita et al.

(10) Patent No.: US 8,185,291 B2
(45) Date of Patent: May 22, 2012

(54) STALL PREDICTION APPARATUS, PREDICTION METHOD THEREOF, AND ENGINE CONTROL SYSTEM

(75) Inventors: Tomofumi Nakakita, Tokorozawa (JP); Takashi Tomiyama, Tokyo (JP); Fumitaka Takemura, Kawasaki (JP)

(73) Assignees: IHI Corporation (JP); IHI Scube Co., Ltd. (JP)

( * ) Notice: Subject to any disclaimer, the term of this patent is extended or adjusted under 35 U.S.C. 154(b) by 679 days.

(21) Appl. No.: 12/301,525

(22) PCT Filed: May 18, 2007

(86) PCT No.: PCT/JP2007/060230
§ 371 (c)(1),
(2), (4) Date: Nov. 19, 2008

(87) PCT Pub. No.: WO2007/135991
PCT Pub. Date: Nov. 29, 2007

(65) Prior Publication Data
US 2009/0312930 A1    Dec. 17, 2009

(30) Foreign Application Priority Data

May 19, 2006    (JP) .................................. 2006-140257

(51) Int. Cl.
*F04D 27/00*    (2006.01)
*F02C 9/00*    (2006.01)
*G05B 9/03*    (2006.01)
(52) U.S. Cl. ...... 701/100; 701/30.5; 701/30.6; 701/31.1
(58) Field of Classification Search ......................... None
See application file for complete search history.

(56) References Cited

U.S. PATENT DOCUMENTS 4,032,757 A    6/1977    Eccles .......................... 235/150.2
(Continued)

FOREIGN PATENT DOCUMENTS

EP    1 455 067    9/2004
(Continued)

OTHER PUBLICATIONS

Hoenen, et al., "Development of a Surge Prediction System for Multi Stage Axial Compressors", Proceedings of the International Gas Turbine Congress 2003 Tokyo, IGTC2003Tokyo TS-040, Nov. 2-7, 2003, pp. 1-6.

(Continued)

*Primary Examiner* — Michael J. Zanelli
(74) *Attorney, Agent, or Firm* — Ostrolenk Faber LLP

(57) ABSTRACT

A stall prediction apparatus of an axial compressor provided with: a rotor provided with a plurality of rotor blades; and a cylindrical casing facing the rotor blades and provided so as to cover the outer circumference of the rotor, comprising: pressure sensors provided in equal numbers at a plurality of locations in a circumferential direction of an inner wall surface of the casing, an index calculator for calculating an index (stall risk index) for evaluating the stall risk based on time-series data detected by each of the pressure sensors, and a signal processor for predicting the stall occurrence based on the stall risk indexes obtained corresponding to said each of the pressure sensors. In accordance with the present invention, it is possible to obtain a stall risk index which is highly accurate (supersensitive) and stable necessary for the active stall control, and to realize an engine control system with high reliability.

3 Claims, 6 Drawing Sheets

U.S. PATENT DOCUMENTS

| | | | | |
|---|---|---|---|---|
| 5,915,917 | A | 6/1999 | Eveker et al. | 415/1 |
| 6,010,303 | A | 1/2000 | Feulner | 415/118 |
| 6,098,010 | A * | 8/2000 | Krener et al. | 701/100 |
| 6,231,306 | B1 | 5/2001 | Khalid | 416/26 |
| 6,438,484 | B1 * | 8/2002 | Andrew et al. | 701/100 |
| 6,506,010 | B1 | 1/2003 | Yeung et al. | 415/1 |
| 6,536,284 | B2 * | 3/2003 | Bonanni | 73/660 |
| 6,715,984 | B2 | 4/2004 | Nakajima et al. | 415/1 |
| 6,793,455 | B2 | 9/2004 | Prasad et al. | 415/1 |
| 2003/0007860 | A1 | 1/2003 | Nakajima et al. | 415/1 |
| 2004/0068387 | A1 | 4/2004 | Bonanni et al. | 702/138 |
| 2005/0132712 | A1 | 6/2005 | Krok et al. | 60/772 |

FOREIGN PATENT DOCUMENTS

| | | |
|---|---|---|
| JP | 50-59612 | 5/1975 |
| JP | 53-87906 | 7/1978 |
| JP | 4-5201 | 1/1992 |
| JP | 5-53658 | 3/1993 |
| JP | 6-213000 | 8/1994 |
| JP | 7-248273 | 9/1995 |
| JP | 10-502992 | 3/1998 |
| JP | 2002-364582 | 12/2002 |
| JP | 2002-371989 | 12/2002 |
| JP | 2004-124946 | 4/2004 |
| JP | 2005-188514 | 7/2005 |
| JP | 2002-364582 | 12/2008 |

OTHER PUBLICATIONS

Tahara, et al., "Active Stall Coptrol With Practicable Stall Prediction System Using Auto-Correlation Coefficient", 37th AIAA/ASME/SAE/ASEE Joint Propulsion Conference, AIAA 2001-3623, Jul. 8-11, 2001, pp. 1-7.

Tahara, et al. "Early pre-stall investigation by sensitive stall warning technique", Proceedings of the International Gas Turbine Congress 2003 Tokyo, IGTC2003Tokyo TS-044, Nov. 2-7, 2003, pp. 1-6.

Tahara, et al., "Early Stall Warning Technique for Axial Flow Compressors", Proceedings of ASME Turbo Expo 2004, GT2004-53292, Jun. 14-17, 2004, pp. 1-10.

Fiscal year 2004, Key Technology Development in Aircraft Advanced System, ~Technology Development in Engine Stall Prediction System ~, Accomplishment Report for Publication, Ishikawajima-Harima Heavy Industries Co., Ltd., Mar. 11, 2005 (partial English translation).

Fiscal year 2005, Key Technology Development in Aircraft Advanced System, ~Technology Development in Engine Stall Prediction System ~, Accomplishment Report for Publication, Ishikawajima-Harima Heavy Industries Co., Ltd., Mar. 17, 2006 (partial English translation).

* cited by examiner

STALL PREDICTION APPARATUS, PREDICTION METHOD THEREOF, AND ENGINE CONTROL SYSTEM

CROSS REFERENCE TO RELATED APPLICATIONS

The present application is a 35 U.S.C. §371 National Phase conversion of PCT/JP2007/060230, filed May 18, 2007, which claims benefit of Japanese Application No. 2006-140257, filed May 19, 2006, the disclosure of which is incorporated herein by reference. The PCT International Application was published in the Japanese language.

TECHNICAL FIELD

The present invention relates to a stall prediction apparatus, prediction method thereof, and an engine control system.

Priority is claimed on Japanese Patent Application No. 2006-140257, filed on May 19, 2006, the content of which is incorporated herein by reference.

BACKGROUND ART

In an axial compressor which is used for a gas turbine engine, a jet engine, or the like, when a stall occurs, failures occur such as a decrease in a pressure ratio, a decrease in an adiabatic efficiency, a decrease in an inflow rate, an adverse flow of an air, or the like. Accordingly, a conventional axial compressor needed to operate with a sufficient margin from an originating point of the stall phenomenon, whereby it was not possible to operate it with its potential performance.

In order to solve these problems, an engine control (active stall control) is proposed which predicts a stall occurrence and avoids the stall from occurring by an actuation. As a stall prediction technique for realizing the active stall control, for example, Patent Document 1 discloses a technique for predicting the stall occurrence by providing a high response pressure sensor on an inner wall surface of a casing in the vicinity of a leading edge of a rotor blade, calculating an autocorrelation value of time-series data of a wall pressure detected by the high response pressure sensor as an index (stall risk index) to evaluate a stall risk, and predict the stall occurrence based on the stall risk index. Patent Document 2 discloses a technique for predicting the stall occurrence by performing frequency demodulation processing with time-series data of parameters (pressure, etc) relative to the compressor, performing a filter processing by using a Kalman filter, calculating a Kalman filter innovation which shows a difference between raw data of the parameters and an estimate value after the filter processing, and using the standard deviation of the Kalman filter innovation as the stall risk index. Patent Document 3 further discloses a technique for calculating the stall risk index by performing a wavelet transformation relative to data showing parameters (pressure etc) relative to the compressor.

U.S. Pat. No. 6,715,984 B2.

Patent Document 2: Japanese Unexamined Patent Application, First Publication No. 2004-124946

Patent Document 3: Japanese Unexamined Patent Application, First Publication No. 2005-188514

DISCLOSURE OF THE INVENTION

Problem to be Solved by the Invention

As described above, there are various conventional stall prediction techniques, however, the stall risk index sometimes experiences a large time-wise fluctuation or a timing of appearance thereof differs a lot depending on locations in a circumferential direction of the axial compressor (circumferential nonuniformity). Accordingly, it is not possible to accurately predict the stall occurrence, whereby stall avoiding control is unstable or it is difficult to make failure diagnosis relative to sensors for measuring pressure or the like.

The present invention was made in view of the above-described circumstances. An objective of the invention is to obtain a stall risk index which is highly accurate (supersensitive) and stable which is necessary for the active stall control as well as to realize an engine control system which is stable and highly reliable.

Means for Solving the Problem

To achieve the above-described objectives, a first embodiment of a stall prediction apparatus of the present invention is a stall prediction apparatus of an axial compressor having a rotor provided with a plurality of rotor blades and a cylindrical casing facing the rotor blades and provided so as to cover the outer circumference of the rotor. The stall prediction apparatus has one or more pressure sensors provided at each one of a plurality of locations in a circumferential direction of an inner wall surface of the casing, an index calculator for calculating an index (stall risk index) for evaluating a stall risk based on time-series data detected by each of the pressure sensors, and a signal processor for predicting the stall occurrence based on the stall risk indexes obtained corresponding to said each of the pressure sensors.

A second embodiment of a stall prediction apparatus of the present invention is, in the first embodiment, the signal processor predicts the stall occurrence based on an average value of the stall risk indexes obtained corresponding to the each pressure sensors provided in the plurality of locations.

A third embodiment of a stall prediction apparatus of the present invention is, in the first embodiment, the signal processor predicts the stall occurrence based on the maximum value of the stall risk indexes obtained corresponding to the pressure sensors provided in the plurality of locations.

A fourth embodiment of a stall prediction apparatus of the present invention is, in the first embodiment, two or more pressure sensors are provided at each one of the plurality of locations and the signal processor determines if failure occurs in the pressure sensors provided at any of the plurality of locations based on the stall risk indexes obtained corresponding to the pressure sensors provided at said any of the plurality of locations.

A fifth embodiment of a stall prediction apparatus of the present invention is, in the fourth embodiment, two or more pressure sensors are provided at each one of the plurality of locations. The signal processor determines that all of the pressure sensors provided at any of the plurality of locations have failures when the differences among the stall risk indexes obtained corresponding to the pressure sensors provided at said any of the plurality of locations exceed a predetermined threshold value. The signal processor predicts the stall occurrence based on the average value of the stall risk indexes obtained from pressure sensors provided in other locations.

A sixth embodiment of a stall prediction apparatus of the present invention is, in the fourth embodiment, two or more pressure sensors are provided at each one of the plurality of locations. When the difference among the stall risk indexes obtained corresponding to the pressure sensors provided at said any of the plurality of locations exceeds a predetermined threshold value, the signal processor determines pressure sensors provided at said any of the plurality of locations which obtain substantially the same values compared with an estimated value by the stall risk indexes obtained from pressure sensors provided in other locations are normal, while the signal processor determines pressure sensors provided at said any of the plurality of locations which obtain values which are different from said estimated value is in the state of failure. The signal processor predicts the stall occurrence based on an average value of the stall risk indexes obtained from the pressure sensors determined to be normal at said any of the plurality of locations and the pressure sensors provided in other locations.

A seventh embodiment of a stall prediction apparatus of the present invention is, in the fourth embodiment, two or more pressure sensors are provided at each one of the plurality of locations. When the difference among the stall risk indexes obtained corresponding to the pressure sensors provided at said any of the plurality of locations exceeds a predetermined threshold value, the signal processor determines pressure sensors provided at said any of the plurality of locations which obtains the maximum stall risk indexes are normal, while the signal processor determines the other pressure sensors provided at said any of the plurality of locations are in the state of failure. The signal processor predicts the stall occurrence based on an average value of the stall risk indexes obtained from the pressure sensors determined to be normal at said any of the plurality of locations and the pressure sensors provided in other locations.

An eighth embodiment of a stall prediction apparatus of the present invention is, in any one of the first to the seventh embodiment, the signal processor further includes: a rotating speed sensor for detecting a rotating speed of the rotor; and a storage device for storing specific bias values for correction of said each of the pressure sensors which are the differences between the stall risk indexes obtained corresponding to said each of the pressure sensors which are obtained in advance before operating the axial compressor and the average value of the stall risk indexes, and for storing in advance a relationship between the rotating speed and the bias value for correction corresponding to said each of the pressure sensors. The signal processor corrects the stall risk index by subtracting the bias values for correction corresponding to the rotating speed in real operation based on the relationship between the rotating speed and the bias value for correction from the stall risk indexes obtained corresponding to said each of the pressure sensors.

A ninth embodiment of a stall prediction apparatus of the present invention is, in any one of the first to the eighth embodiment, the signal processor performs a time average processing for each of the stall risk indexes obtained corresponding to said each of the pressure sensors.

A first embodiment of a stall prediction method of the present invention is a stall prediction method of an axial compressor which includes a rotor provided with a plurality of rotor blades and a cylindrical casing facing the rotor blades and provided so as to cover the outer circumference of the rotor. The stall prediction method provides one or more pressure sensors at each one of a plurality of locations in a circumferential direction of an inner wall surface of the casing, and calculates an index for evaluating a stall risk (stall risk index) based on time-series data detected by each of the pressure sensors. The stall prediction method predicts the stall occurrence based on the stall risk index obtained corresponding to said each of the pressure sensors.

A first embodiment of an engine control system of the present invention is a control system of an engine provided with an axial compressor. The control system has a stall prediction apparatus of the first to the ninth embodiment of the present invention for predicting the stall occurrence of the axial compressor, and an engine controller for controlling the engine based on the stall prediction result by the stall prediction apparatus.

A second embodiment of an engine control system of the present invention is, in the first embodiment of the engine control system, the stall prediction apparatus has a redundant system provided with N systems having a pair of pressure sensors provided in N (N≧2) locations and the index calculator, two systems of signal processors for predicting the stall occurrence based on a stall risk index obtained from the N systems, and two systems of engine controller corresponding respectively to the two systems of the signal processors.

EFFECT OF THE INVENTION

In accordance with the present invention, it is possible to obtain a stall risk index which is highly accurate (supersensitive) and stable which is necessary for an active stall control by eliminating a time-wise fluctuation in the stall risk index and an influence of a circumferential nonuniformity. By obtaining the stall risk index which is highly accurate (supersensitive) and stable, it is possible to improve the accuracy of fault diagnoses of the pressure sensors, whereby it is possible to realize a stable engine control system provided with high reliability necessary for the active stall control.

BRIEF DESCRIPTION OF THE REFERENCE NUMERALS

Figure 1:
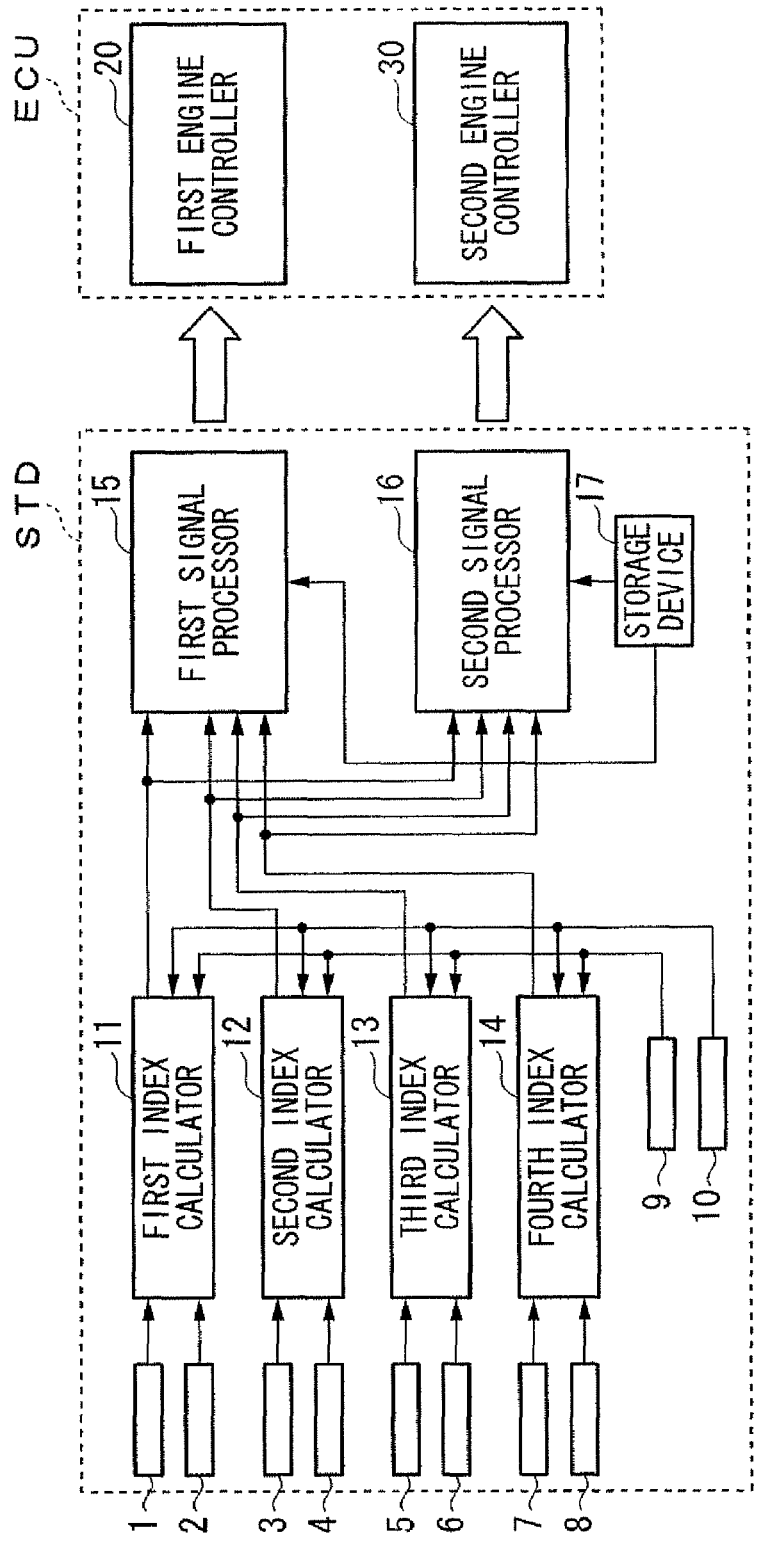
FIG. 1 is a structural block diagram of an engine control system in accordance with an embodiment of the present invention.

STD stall prediction apparatus
1 First pressure sensor
2 Second pressure sensor

3 Third pressure sensor
4 Fourth pressure sensor
5 Fifth pressure sensor
6 Sixth pressure sensor
7 Seventh pressure sensor
8 Eighth pressure sensor
9 First rotating speed sensor
10 Second rotating speed sensor
11 First index calculator
12 Second index calculator
13 Third index calculator
14 Fourth index calculator
15 First signal processor
16 Second signal processor
17 Storage device
20 First engine controller
30 Second engine controller
C Axial compressor
C1 rotor blade
C2 Rotor
C3 Casing
C4 Inner wall surface

BEST MODE FOR CARRYING OUT THE INVENTION

An Embodiment of the present invention shall be described with reference to drawings.

FIG. 1 is a structural block diagram of an engine control system in accordance with an embodiment of the present invention. The engine control system is a control system for a gas turbine engine provided with an axial compressor, a jet engine, or the like. The engine control system has an STD (stall prediction apparatus) for predicting a stall occurrence of the axial compressor and an ECU (engine control unit) for controlling the engine based on a stall prediction result by the stall prediction apparatus STD. Here, the engine control unit ECU has two systems of engine controller (a first engine controller 20 and a second engine controller 30).

The stall prediction apparatus STD has a first pressure sensor 1 to an eight pressure sensor 8, a first rotating speed sensor 9 and a second rotating speed sensor 10, a first index calculator 11 to a fourth index calculator 14, a first signal processor 15 and a second signal processor 16, and a storage device 17.

Figure 2A:
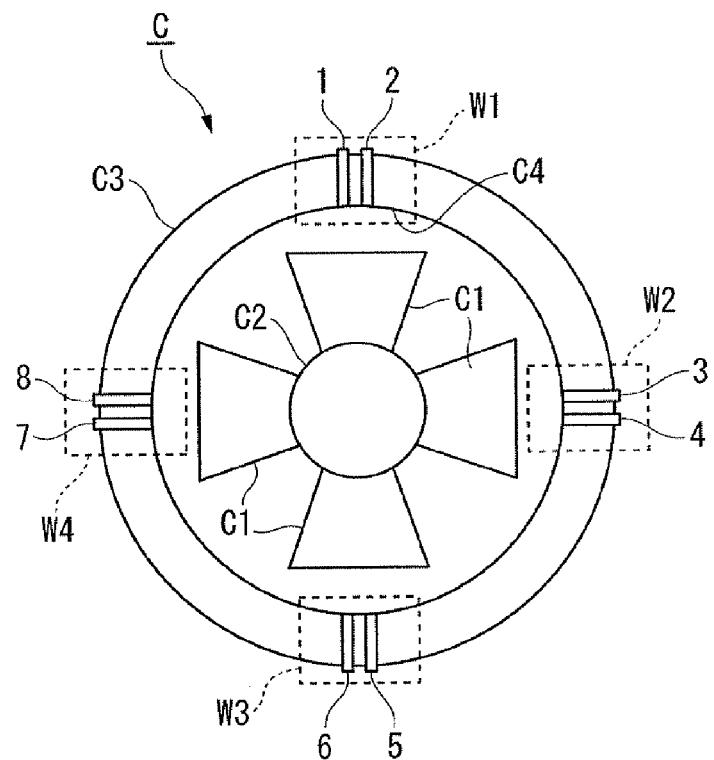
FIG. 2A shows a layout of a pressure sensor relative to an axial compressor in accordance with an embodiment of the present invention.
Figure 2B:
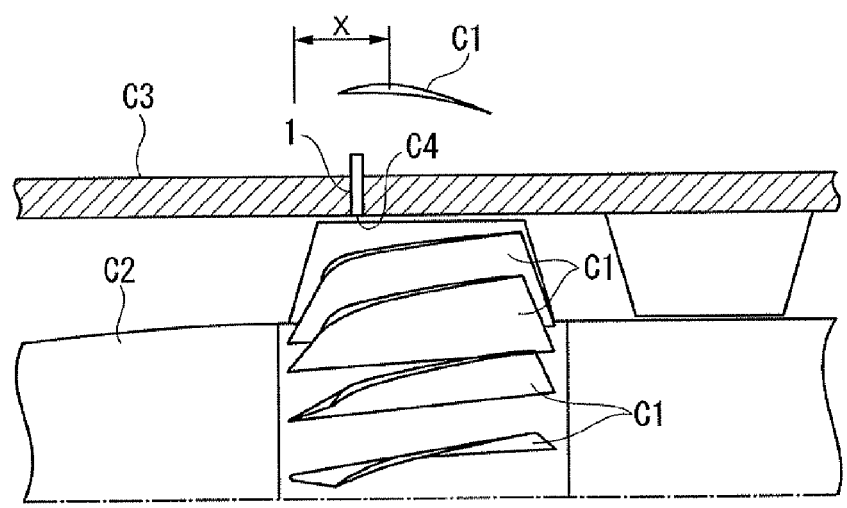
FIG. 2B shows a layout of a pressure sensor relative to an axial compressor in accordance with an embodiment of the present invention.

FIGS. 2A and 2B explain layouts of the first pressure sensor 1 to the eighth pressure sensor 8 relative to an axial compressor C. FIG. 2A is a front view of the axial compressor. FIG. 2B is a cross sectional view of main part (side view) of the axial compressor. The axial compressor C has a rotor C2 provided with a plurality of rotor blades C1 and a cylindrical casing C3 facing the rotor blades C1 and provided so as to cover the outer circumference of the rotor C2. As shown in FIG. 2A, in sensor setting locations W1 to W4 provided along the circumferential direction of the casing C3, each two pressure sensors (two systems) are provided therein so that sensing surfaces of the sensors abut an inner wall surface C4 of the casing C3. That is, in the circumferential direction of the casing C3, the first pressure sensor 1 and the second pressure sensor 2 are provided in the sensor setting location W1 provided in the twelve o'clock location, the third pressure sensor 3 and the fourth pressure sensor 4 are provided in the sensor setting location W2 provided in the three o'clock location, the fifth pressure sensor 5 and the sixth pressure sensor 6 are provided in the sensor setting location W3 provided in the six o'clock location, and the seventh pressure sensor 7 and the eighth pressure sensor 8 are provided in the sensor setting location W4 provided in the nine o'clock location.

As shown in FIG. 2B, each of the pressure sensors are provided on the inner wall surface C4 within a range X from the vicinity of a leading edge of a rotor blade C1 to the center of a front end and a rear end of a rotor blade tip. Here, the leading edge X includes an upper stream area of the rotor blade C1 which shows the same indication due to a passing of the rotor blade C1. Here, among the pressure sensors provided in each of the sensor setting locations, odd numbers (the first pressure sensor 1, the third pressure sensor 3, the fifth pressure sensor 5, and the seventh pressure sensor 7) are α system and even numbers (the second pressure sensor 2, the fourth pressure sensor 4, the sixth pressure sensor 6, and the eighth pressure sensor 8) are β system.

The first pressure sensor 1 to the eighth pressure sensor 8 are high response pressure sensors which detect wall pressure fluctuations caused by the rotation of the rotor blade C1 in the inner wall surface C4 of each of the sensor setting locations W1 to W4 and output pressure detection signals showing the wall pressure fluctuations to the first index calculator 11 to the fourth index calculator 14. More specifically, the first pressure sensor 1 and the second pressure sensor 2 detect the wall pressure fluctuations in the inner wall surface C4 in the sensor setting location W1 and output the pressure detection signal showing the wall pressure fluctuations to the first index calculator 11. The third pressure sensor 3 and the fourth pressure sensor 4 detect the wall pressure fluctuations in the inner wall surface C4 in the sensor setting location W2 and output the pressure detection signal showing the wall pressure fluctuations to the second index calculator 12. The fifth pressure sensor 5 and the sixth pressure sensor 6 detect the wall pressure fluctuations in the inner wall surface C4 in the sensor setting location W3 and output the pressure detection signal showing the wall pressure fluctuations to the third index calculator 13. The seventh pressure sensor 7 and the eighth pressure sensor 8 detect the wall pressure fluctuations in the inner wall surface C4 in the sensor setting location W4 and output the pressure detection signal showing the wall pressure fluctuations to the fourth index calculator 14.

Now, FIG. 1 shall be further explained. The first rotating speed sensor 9 and the second rotating speed sensor 10 are pulse pickups, for example, which detect a rotating speed which is one pulse per one rotation of the rotor C2 of the axial compressor C, and output a rotational pulse signal showing the rotating speed to the first index calculator 11 to the fourth index calculator 14. In this manner, by having two systems of the rotating speed sensors, even if one of them has a failure, it is possible to normally detect the rotating speed. Here, the first rotating speed sensor 9 is the α system and the second rotating speed sensor 10 is the β system.

The first index calculator 11 calculates an index for evaluating the stall risk (stall risk index) based on a pressure detection signal input from the first pressure sensor 1 and the second pressure sensor 2, that is, time-series data showing the wall pressure fluctuations in the inner wall surface C4 in the sensor setting location W1. Here, the first index calculator 11 individually calculates a stall risk index corresponding to each of the first pressure sensor 1 and the second pressure sensor 2. The first index calculator 11 outputs the first index signal showing the stall risk index obtained from the first pressure sensor 1 and the stall risk index obtained from the second pressure sensor 2 to the first signal processor 15 and the second signal processor 16. The first index calculator 11 calculates the rotating speed based on the rotating pulse signal input from the first rotating speed sensor 9 and the second rotating speed sensor 10. The first index calculator 11 has a function for outputting a rotating speed signal showing the rotating speed to the first signal processor 15 and the second signal processor 16.

The second index calculator 12 calculates the stall risk index based on the pressure detection signal input from the third pressure sensor 3 and the fourth pressure sensor 4, that is, time-series data showing the wall pressure fluctuations in the inner wall surface C4 in the sensor setting location W2. Here, the second index calculator 12 individually calculates a stall risk index corresponding to each of the third pressure sensor 3 and the fourth pressure sensor 4. The second index calculator 12 outputs the second index signal showing the stall risk index obtained from the third pressure sensor 3 and the stall risk index obtained from the fourth pressure sensor 4 to the first signal processor 15 and the second signal processor 16. The second index calculator 12 calculates the rotating speed based on the rotating pulse signal input from the first rotating speed sensor 9 and the second rotating speed sensor 10. The second index calculator 12 has a function for outputting a rotating speed signal showing the rotating speed to the first signal processor 15 and the second signal processor 16.

The third index calculator 13 calculates the stall risk index based on the pressure detection signal input from the fifth pressure sensor 5 and the sixth pressure sensor 6, that is, time-series data showing the wall pressure fluctuations in the inner wall surface C4 in the sensor setting location W3. Here, the third index calculator 13 individually calculates a stall risk index corresponding to each of the fifth pressure sensor 5 and the sixth pressure sensor 6. The third index calculator 13 outputs the third index signal showing the stall risk index obtained from the fifth pressure sensor 5 and the stall risk index obtained from the sixth pressure sensor 6 to the first signal processor 15 and the second signal processor 16. The third index calculator 13 calculates the rotating speed based on the rotating pulse signal input from the first rotating speed sensor 9 and the second rotating speed sensor 10. The third index calculator 13 has a function for outputting a rotating speed signal showing the rotating speed to the first signal processor 15 and the second signal processor 16.

The fourth index calculator 14 calculates the stall risk index based on the pressure detection signal input from the seventh pressure sensor 7 and the eighth pressure sensor 8, that is, time-series data showing the wall pressure fluctuations in the inner wall surface C4 in the sensor setting location W4. Here, the fourth index calculator 14 individually calculates a stall risk index corresponding to each of the seventh pressure sensor 7 and the eighth pressure sensor 8. The fourth index calculator 14 outputs the fourth index signal showing the stall risk index obtained from the seventh pressure sensor 7 and the stall risk index obtained from the eighth pressure sensor 8 to the first signal processor 15 and the second signal processor 16. The fourth index calculator 14 calculates the rotating speed based on the rotating pulse signal input from the first rotating speed sensor 9 and the second rotating speed sensor 10. The fourth index calculator 14 has a function for outputting a rotating speed signal showing the rotating speed to the first signal processor 15 and the second signal processor 16.

The first signal processor 15 and the second signal processor 16 perform fault diagnoses relative to the pressure sensors and stall prediction relative to the axial compressor C by performing a predetermined signal processing based on the first to the fourth index signals and the rotating speed signal. The first signal processor 15 and the second signal processor 16 correct the stall risk index based on an approximate polynomial showing a relationship between the rotating speed of the rotor C2 and a bias value for correction of the stall risk index stored in the storage device 17 corresponding to each of the pressure sensors. Further details shall be described later.

Here, signals showing the fault diagnoses results of the pressure sensors and the stall prediction results are sent to the first engine controller 20 and the second engine controller 30 respectively from the first signal processor 15 and the second signal processor 16.

The storage device 17 is a flash memory, for example, which stores the approximate polynomial in advance showing a relationship between the rotating speed of the rotor C2 and the bias value for correction of the stall risk index corresponding to each of the pressure sensors.

The first engine controller 20 and the second engine controller 30 perform an active stall control of the engine based on the fault diagnoses results of the pressure sensors and the stall prediction results obtained from the first signal processor 15 and the second signal processor 16.

As described above, the engine control system has a ¾ active redundancy system provided with four systems having a pair of pressure sensors provided in each of the sensor setting locations W1 to W4 and the index calculator, and a ½ stand-by redundancy system provided with two systems of a pair of the signal processor and the corresponding engine controller. Accordingly, when any of the pressure sensors provided in the sensor setting locations W1 to W4 has a failure or when either of the signal processor or the engine controller has a failure, it is possible to perform an appropriate stall prediction, whereby it is possible to realize safe engine control.

Here, the ¾ active redundancy system is a system which always uses 4 systems and employs the average value thereof. When one of the four systems has a failure, the rest of the three systems operate. The ½ stand-by redundancy system is a system which sets one of the two systems as an active channel and the other system as a stand-by channel. The ½ stand-by redundancy system usually uses the active channel system and when this system has a failure, the system is switched to the stand-by channel.

Figure 3:
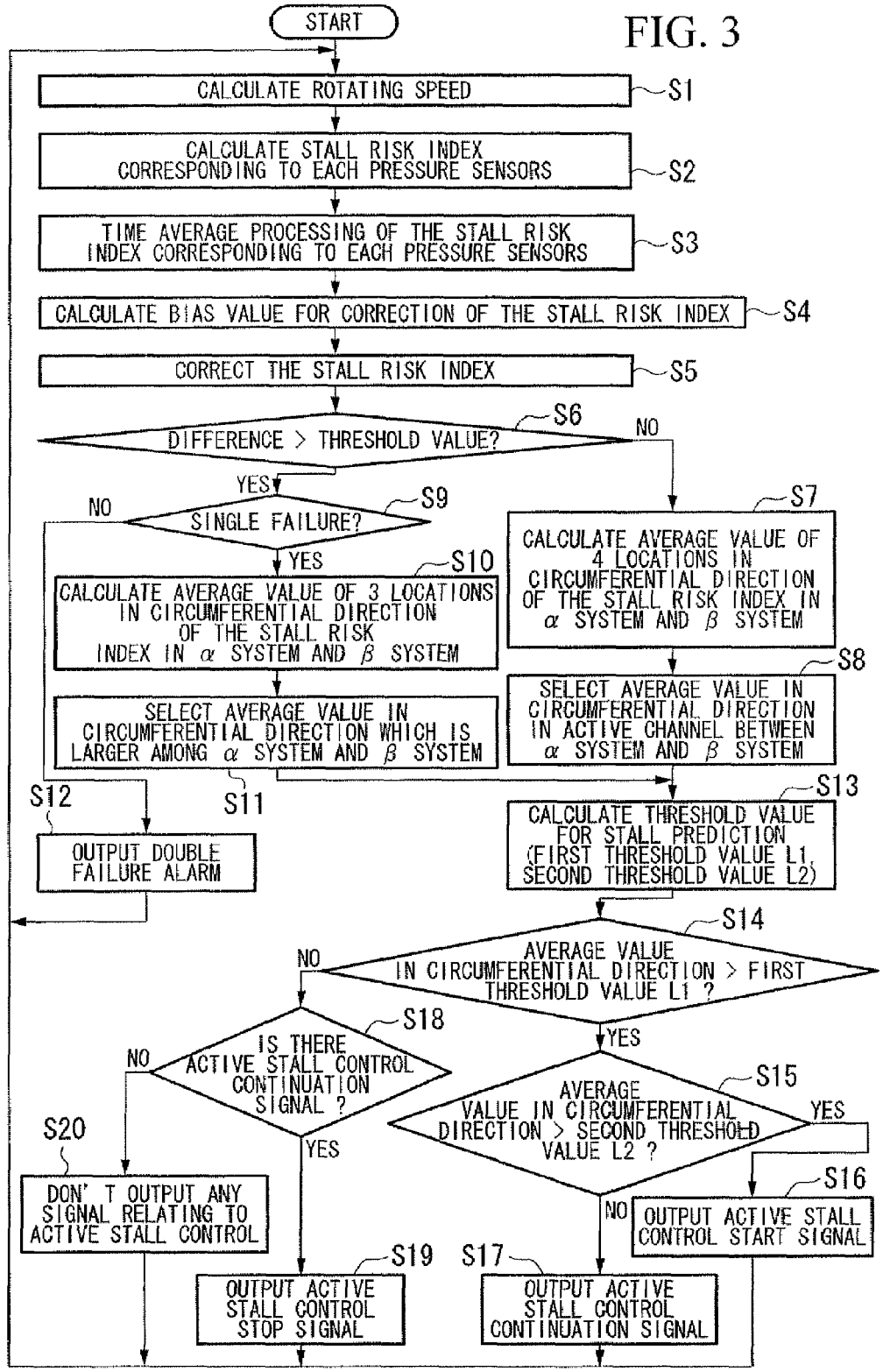
FIG. 3 is an operational flow chart of a stall prediction apparatus in accordance with an embodiment of the present invention.

Next, an operation of the engine control system constituted as above, in particular, a stall prediction operation in the stall prediction apparatus STD shall be described by referring to a flowchart in FIG. 3.

When the engine is in operation, the pressure sensors of the α system and the β system provided in each of the sensor setting locations W1 to W4 of the axial compressor C detect the wall pressure fluctuations on the inner wall surface C4, in which each of the pressure sensors are provided, output the pressure detection signal to the first index calculator 11 to the fourth index calculator 14 which are provided corresponding to each of the pressure sensors. The first rotating speed sensor 9 and the second rotating speed sensor 10 output the rotating pulse signal showing the rotating speed of the rotor C2 of the axial compressor C to the first index calculator 11 to the fourth index calculator 14.

The first index calculator 11 to the fourth index calculator 14 calculate the rotating speed (Step S1) based on the rotating pulse signal individually output from the first rotating speed sensor 9 and the second rotating speed sensor 10. In the present embodiment, the first rotating speed sensor 9 of the α system is the active channel (the second rotating speed sensor 10 is the stand-by channel) and the rotating speed is calculated based on the rotating pulse signal obtained from the first rotating speed sensor 9. Here, when the first rotating speed sensor 9 has a failure, the rotating speed may be calculated based on the rotating pulse signal obtained from the second rotating speed sensor 10.

As a method to determine whether the rotating speed sensor has a failure or not, it is possible to determine the case where the rotating pulse signal is detected alternately from both channels as normal and the other case as abnormal since the rotating pulse signal is not output simultaneously from the active channel and the stand-by channel due to phase differences. For example, when the rotating pulse signal of the active channel is detected two times in a row, the standby channel is determined to have a failure.

The first index calculator 11 to the fourth index calculator 14 calculate the stall risk index (Step S2) based on the pressure detection signal obtained from the pressure sensors of the α system and the β system, that are, the time-series data showing the wall pressure fluctuations. In the present embodiment, as a calculation method of the stall risk index, a technique of U.S. Pat. No. 6,715,984 B2 (Patent Document 1) is employed. Although detailed explanation is omitted, the calculation method of the stall risk index calculates an autocorrelation value between a data set within a predetermined time of the time-series data showing the wall pressure fluctuations and a data set which is one cycle earlier or a plurality of cycles earlier as the stall risk index. Here, a time span for calculating the autocorrelation value may be equivalent every blade passages of the rotor blade C1 or one rotation of the rotor blade C1 as long as the time span is within one rotation of the rotor blade C1.

Figure 4A:
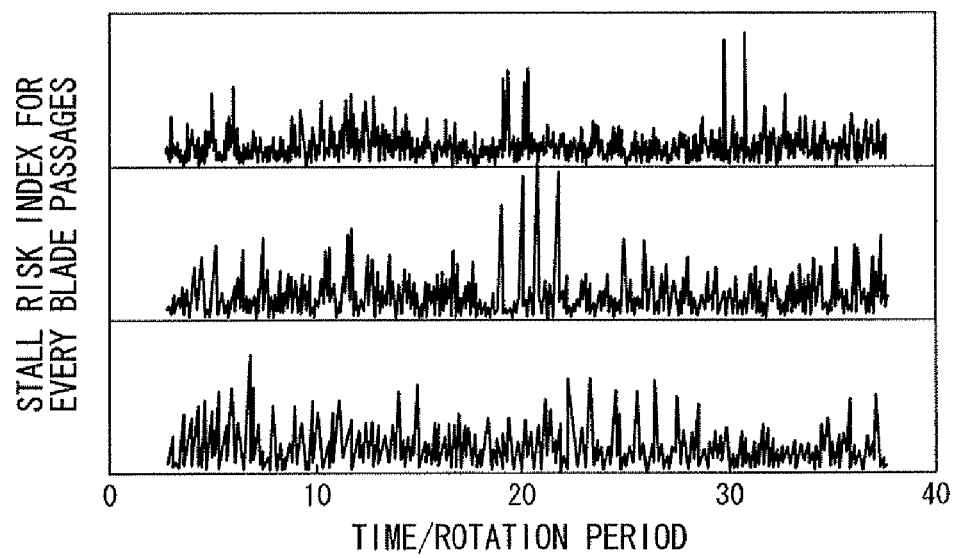
FIG. 4A is a first explanatory drawing relative to a stall prediction processing in accordance with an embodiment of the present invention.

FIG. 4A shows one example of a calculation result of the autocorrelation value (stall risk index) with the time span equivalent to the every blade passages of the rotor blade C1 as described above. Here, FIG. 4A shows the stall risk index calculated based on the time-series data obtained from the pressure sensors provided in predetermined three locations of the axial compressor C. As shown in FIG. 4A, the stall risk index has large time-wise fluctuations and with this state it is very difficult to accurately predict the stall occurrence or to perform fault diagnoses of the pressure sensors which will be described later.

The first index calculator 11 outputs the first index signal showing the stall risk index obtained corresponding to the α system (first pressure sensor 1) and the β system (second pressure sensor 2) by the calculation method as described above and the rotating speed signal showing the rotating speed to the first signal processor 15 and the second signal processor 16. In the same manner, the second index calculator 12 outputs the second index signal showing the stall risk index obtained corresponding to the α system (third pressure sensor 3) and the β system (fourth pressure sensor 4) and the rotating speed signal showing the rotating speed to the first signal processor 15 and the second signal processor 16. The third index calculator 13 outputs the third index signal showing the stall risk index obtained corresponding to the α system (fifth pressure sensor 5) and the β system (sixth pressure sensor 6) and the rotating speed signal showing the rotating speed to the first signal processor 15 and the second signal processor 16. Furthermore, the fourth index calculator 14 outputs the fourth index signal showing the stall risk index obtained corresponding to the α system (seventh pressure sensor 7) and the β system (eighth pressure sensor 8) and the rotating speed signal showing the rotating speed to the first signal processor 15 and the second signal processor 16.

Figure 4B:
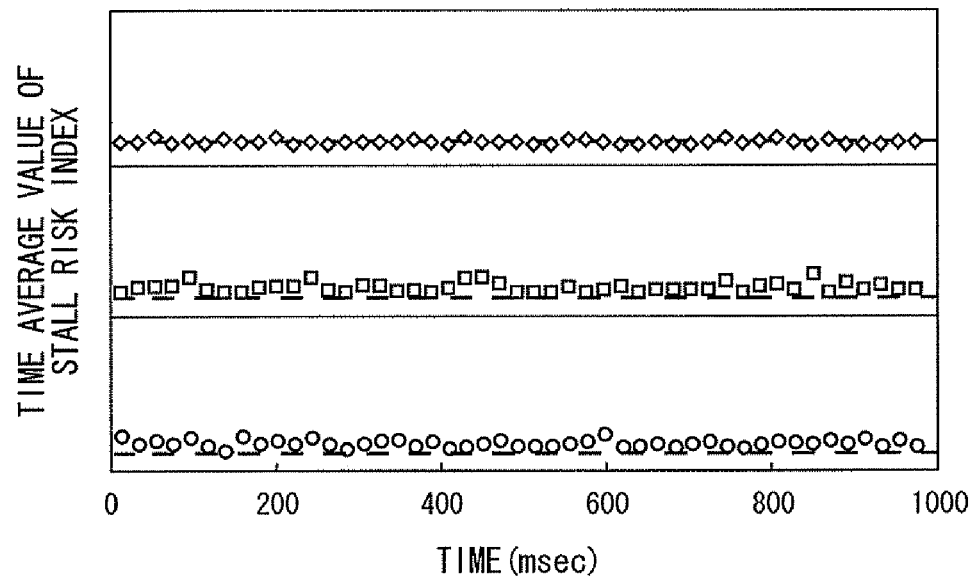
FIG. 4B is a first explanatory drawing relative to a stall prediction processing in accordance with an embodiment of the present invention.

Next, the first signal processor 15 and the second signal processor 16 perform time average processing (Step S3) to the stall risk index corresponding to each of the pressure sensors of the α system and the β system obtained from the first index calculator 11 to the fourth index calculator 14 as described above. Here, as a method of the time average processing, various methods can be employed such as an averaging or a second root mean. FIG. 4B shows a second root mean value within 20 ms in the stall risk index of FIG. 4A. As shown in FIG. 4B, by performing the time average processing, it is possible to substantially reduce the time-wise fluctuations of the stall risk index. Accordingly, it is possible to accurately predict the stall occurrence or perform fault diagnoses of the pressure sensors. Here, preferably the duration for the averaging is sufficient to be able to stabilize the engine control, such as an engine control cycle or a half of the engine control cycle, and short enough not to delay the stall prediction timing, and consistent with the engine controller.

Next, the first signal processor 15 and the second signal processor 16 calculate a bias value for correction (Step S4) at the rotating speed during operation based on the approximate polynomial showing a relationship between the rotating speed of the rotor C2 and the bias value for correction of the stall risk index corresponding to each of the pressure sensors stored in the storage device 17. Hereinafter, the bias value for correction shall be described in detail.

As described above, as reasons for not being able to predict the stall occurrence accurately, time-wise fluctuations of the stall risk index or circumferential nonuniformity of the stall risk index which occurs depends on the setting locations of the pressure sensors in the circumferential direction of the axial compressor C can be considered. Among them, as a reason for the circumferential nonuniformity of the stall risk index, appearance timing or size of the stall precursor being different depending on the actual setting locations can be considered. Individual differences of the pressure sensors or the circumferential nonuniformity of a clearance between the inner wall surface C4 of the casing C3 and the tip of the rotor blade can be considered as another reason.

The former reason should not be corrected but the latter reason should be corrected.

Therefore, first, before the actual operation (such as an operation before shipment of a new engine or at the time of maintenance), the stall risk indexes obtained from each of the pressure sensors at steady operations under various rotating speeds are measured and a circumferential average value thereof is calculated. Here, as the calculation method of the circumferential average value, a method which calculates the circumferential average value of the stall risk indexes obtained from the pressure sensors of the α system and the circumferential average value of the stall risk indexes obtained from the pressure sensors of the β system can be employed. Or a method which calculates the circumferential average value of the stall risk indexes obtained from all of the pressure sensors provided in the circumferential direction can be employed.

A specific difference of each of the pressure sensors is a difference between the stall risk indexes obtained from each of the pressure sensors and the circumferential average values calculated as described above. Therefore, the specific difference is set as a specific bias value for correction of each of the pressure sensors. In the actual operation, by subtracting the bias value for correction from the stall risk indexes obtained from each of the pressure sensors, it is possible to correct the individual differences of the pressure sensors and the circumferential nonuniformity of the stall risk index stemming from the circumferential nonuniformity of the clearance between the inner wall surface C4 of the casing C3 and the tip of the rotor blade. That is, in the storage device 17, a relationship between the rotating speed of the rotor C2 and the bias value for correction of the stall risk index corresponding to each of the pressure sensors, which is calculated in advance before the actual operation as described above, is stored as an approximate polynomial which is a function of the rotating speed. Accordingly, in the processing of Step S4, the first signal processor 15 and the second signal processor 16 can simultaneously follow the rotating speed continuously changing in the actual operation since it is possible to respectively calculate the bias value for correction corresponding to each of the pressure sensors by substituting the rotating speed in the actual operation in the approximate polynomial.

Here, as described above, the relationship between the rotating speed and the bias value for correction of the stall risk index is stored as the approximate polynomial, it is not limited thereto but it may be stored as a data table.

The first signal processor 15 and the second signal processor 16 correct the stall risk index (Step S5) by subtracting the bias values for correction corresponding to each of the pressure sensors calculated in Step S4 respectively from the stall risk index of each of the pressure sensors performed with the time average processing in Step S3.

Figure 5A:
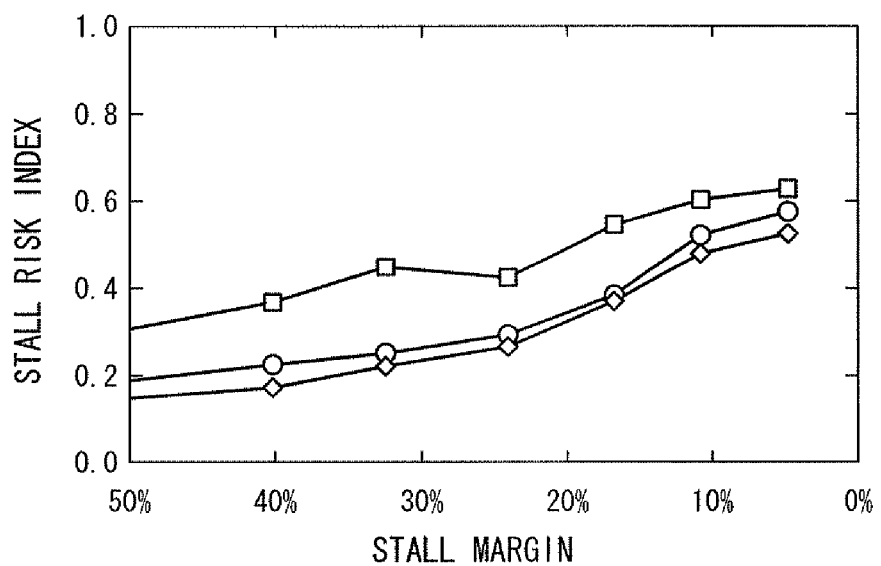
FIG. 5A is a second explanatory drawing relative to a stall prediction processing in accordance with an embodiment of the present invention.

FIG. 5A shows a relationship between the stall risk index (performed with time average processing) and a stall margin in the case where the above described correction is not performed. Here, FIG. 5A shows the stall risk indexes which are calculated based on the time-series data obtained from the pressure sensors provided in the predetermined three locations in the axial compressor C. As shown in FIG. 5A, from a state where the stall margin is wide, it is understood that the difference between the stall risk indexes are large and there are individual differences.

Figure 5B:
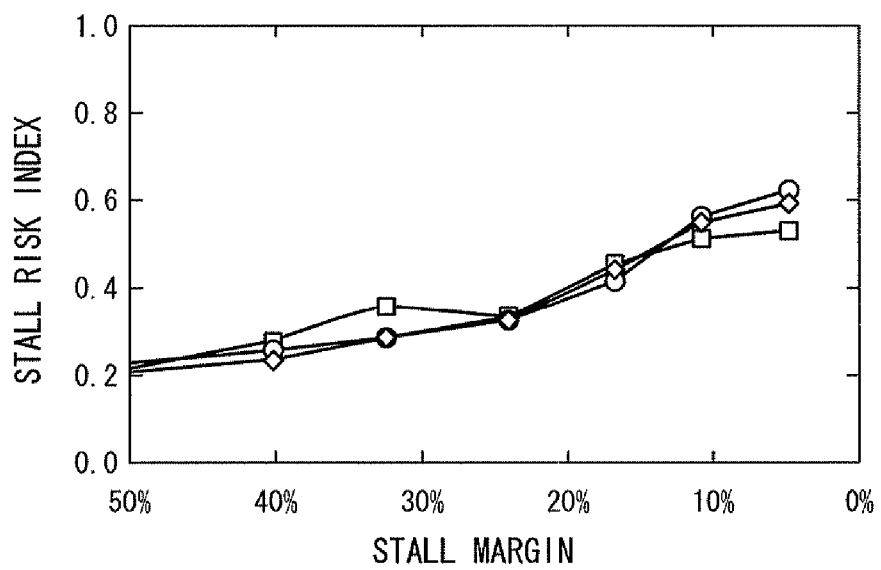
FIG. 5B is a second explanatory drawing relative to a stall prediction processing in accordance with an embodiment of the present invention.

On the other hand, FIG. 5B shows a relationship between the stall risk index and a stall margin in the case where the specific differences (bias values for correction) of each of the pressure sensors are calculated from the circumferential average value at 15% of the stall margin, and the bias values for correction are subtracted from the stall risk index, that is, the correction of Step S5 is performed. As shown in FIG. 5B, by eliminating the individual differences, it is possible to reduce the differences in the stall risk indexes in the circumferential direction. Here, comparing to FIG. 5A, the maximum value of the difference in the stall risk indexes in the circumferential direction is reduced to two fifths.

Next, the first signal processor 15 and the second signal processor 16 perform fault diagnoses of the pressure sensor (Step S6) by determining whether or not the difference among the corrected stall risk indexes obtained from the pressure sensors of the α system and the pressure sensors of the β system provided at the same locations of each one of the sensor setting locations is larger than a predetermined threshold value.

This failure diagnosis is performed per each of the sensor setting locations.

In Step S6, if the answer is "No", that is, in the case where the difference is less than or equal to the predetermined threshold value in the entire sensor setting locations, the first signal processor 15 and the second signal processor 16 determine all of the pressure sensors as normal and calculate the circumferential average value of the stall risk index obtained from each of the pressure sensors (Step S7). The present embodiment individually calculates the circumferential average value of the stall risk indexes obtained from the pressure sensors of the α system among each of the sensor setting locations, and the circumferential average value of the stall risk indexes obtained from the pressure sensors of the β system. The first signal processor 15 and the second signal processor 16 select the circumferential average value of the stall risk indexes, which is designated as the active channel in advance among the α system and the β system, as an index for predicting the stall occurrence eventually (Step S8).

On the other hand, in Step S6, if the answer is "Yes", that is, in the case where the difference is larger than the predetermined threshold value in any of the sensor setting locations, the first signal processor 15 and the second signal processor 16 determine all of the pressure sensors provided in said any of the sensor setting locations have failures, and determine whether the failure is a single failure (a failure is occurred in one sensor setting location) or a double failure (failures are occurred in two or more sensor setting locations) (Step S9). In Step S9, if the answer is "Yes", that is, the single failure has occurred, the first signal processor 15 and the second signal processor 16 calculate the circumferential average value of the stall risk indexes obtained from each of the pressure sensors provided in 3 sensor setting locations excluding the sensor setting location where the single failure has occurred (Step S10). Here as same as Step S7, the circumferential average value of the stall risk indexes obtained from the pressure sensors of the α system and the circumferential average value of the stall risk indexes obtained from the pressure sensors of the β system are calculated individually. The first signal processor 15 and the second signal processor 16 compare the circumferential average value of the α system and the circumferential average value of the β system, select the system with a larger circumferential average value as the active channel system (Step S11), and move to Step S8. In this case, the pressure sensors of the locations determined as failures are set as not usable thereafter.

Figure 6A:
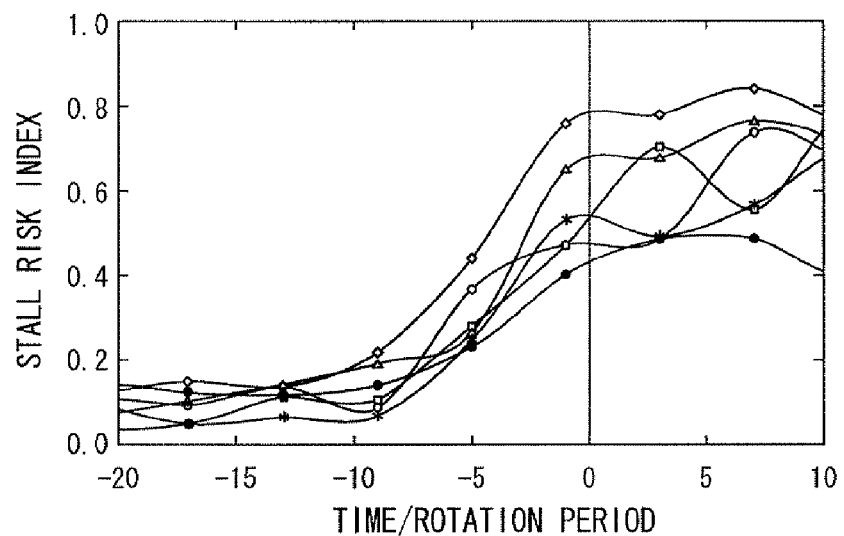
FIG. 6A is a third explanatory drawing relative to a stall prediction processing in accordance with an embodiment of the present invention.

Here, effects of the calculating the circumferential average value of the stall risk indexes as described above shall be described. FIG. 6A shows fluctuations of the stall risk index (performed with the time average processing) obtained from each of the pressure sensors, from the axial compressor C being operated at an intended operational range to the transition to the stall state, in the case where the pressure sensors are provided in six locations along the circumferential direction of the axial compressor C.

The time-wise fluctuations of the stall risk index can be solved by performing the time averaging processing. However, it is understood that the stall risk index substantially fluctuates, that is, the circumferential nonuniformity is large, in accordance with the setting locations of the pressure sensors in the circumferential direction. Generally, in the case where the stall risk index (autocorrelation value of the wall pressure) worsens in a specific location in the circumferential direction, the stall state does not occur immediately but the stall state occurs after the stall risk index worsens in almost all areas in the circumferential direction. Accordingly, as in the present embodiment, calculating the circumferential average value of the stall risk indexes can be considered to be the optimal coping strategy relative to the circumferential nonuniformity.

Figure 6B:
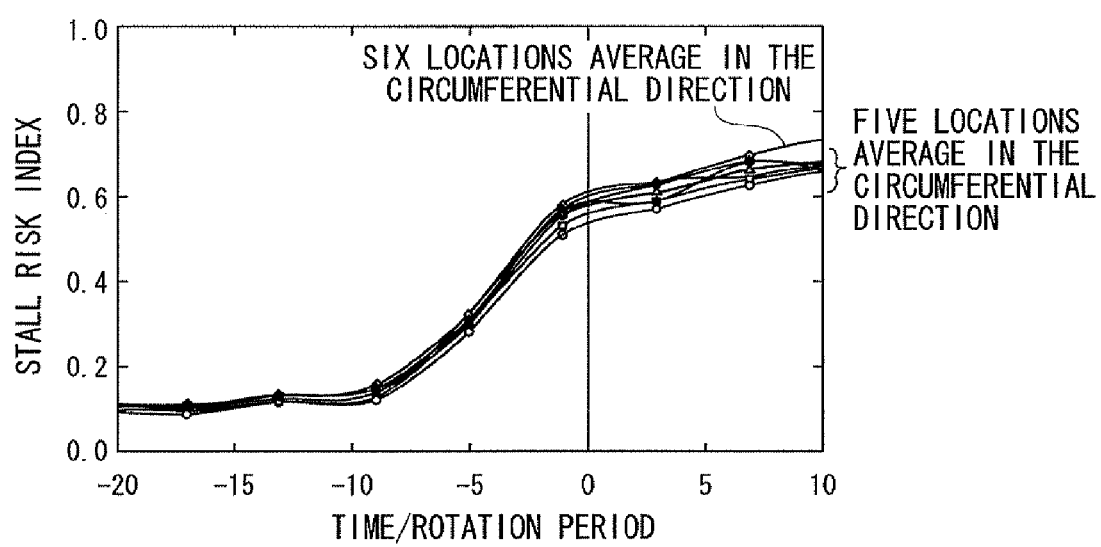
FIG. 6B is a third explanatory drawing relative to a stall prediction processing in accordance with an embodiment of the present invention.

FIG. 6B shows fluctuations of the circumferential average value of the stall risk indexes obtained from each of the pressure sensors in six locations and the circumferential average value of the stall risk indexes obtained from the remaining five pressure sensors in the case where a failure has occurred in one location. As shown in FIG. 6B, in the case where one pressure sensor (equivalent to one location) is lost due to the failure, it is understood that the circumferential average value is barely affected. Accordingly, there are no large differences in the circumferential average values calculated in Step S7 and in Step S10, whereby it is possible to maintain the stall prediction accuracy even when the single failure has occurred. In the case where the single failure has occurred, as in Step S11, by selecting the larger circumferential average value among the circumferential average values of the α system and the β system, it is possible to perform an even safer stall prediction.

On the other hand, in Step S9, if the answer is "No", that is, in the case where the double failure has occurred, double failure alarm signals are output from the first signal processor 15 and the second signal processor 16 respectively to the first engine controller 20 and the second engine controller 30 (Step S12). In this manner, in the case where failures occur in the pressure sensors in two or more locations, an alarm is generated since there is a possibility that the stall prediction accuracy might not be maintained.

Next, the first signal processor 15 and the second signal processor 16 calculate the first threshold value L1 and the second threshold value L2 for predicting the stall occurrence based on the circumferential average value of the stall risk indexes determined by Step S8 (Step S13). Here, the first threshold value L1 is the stall risk index when the active stall control is stopped, and the second threshold value L2 is the stall risk index when the active stall control is started. The first threshold value L1 and the second threshold value L2 fluctuate in accordance with the rotating speed, whereby it is possible to describe them as functions of the rotating speed. That is, the first signal processor 15 and the second signal processor 16 calculate the first threshold value L1 and the second threshold value L2 in real time corresponding to the rotating speed at the time of the operation.

The first signal processor 15 and the second signal processor 16 determine whether or not the circumferential average value of the stall risk indexes determined by Step S8 is larger than the first threshold value L1 (Step S14). In Step S14, in the case where the circumferential average value of the stall risk indexes is determined to be larger than the first threshold value L1 ("Yes"), the first signal processor 15 and the second signal processor 16 determine whether or not the circumferential average value of the stall risk indexes is larger than the second threshold value L2 (Step S15). In Step S15, in the case where the circumferential average value of the stall risk indexes is determined to be larger than the second threshold value L2 ("Yes"), it is possible to determine the stall precursor has occurred, active stall control start signals are output from the first signal processor 15 and the second signal processor 16 respectively to the first engine controller 20 and the second engine controller 30 (Step S16).

In Step S15, in the case where the circumferential average value of the stall risk indexes is determined to be less than or equal to the second threshold value L2 ("No"), it is possible to determine the stall precursor most probably occurs, active stall control continuation signals are output from the first signal processor 15 and the second signal processor 16 respectively to the first engine controller 20 and the second engine controller 30 (Step S17).

On the other hand, in Step S14, in the case where the circumferential average value of the stall risk indexes is determined to be less than or equal to the first threshold value L1 ("No"), it is possible to determine there is no stall occurrence, the first signal processor 15 and the second signal processor 16 determine whether or not the active stall control continuation signal is output (Step S18), in the case where the active stall control continuation signal is determined to be output ("Yes"), active stall control stop signals are output from the first signal processor 15 and the second signal processor 16 respectively to the first engine controller 20 and the second engine controller 30 (Step S19). In Step S18, in the case where the active stall control continuation signal is determined not to be output ("No"), the first signal processor 15 and the second signal processor 16 do not output signals relating to the active stall control (Step S20). The stall prediction apparatus STD repeats the operations S1 to S20 per control cycle of the stall prediction apparatus.

As described above, Step S11 compares the circumferential average value of the α system and the circumferential average value of the β system and select the larger circumferential average value. This is because Step S11 prioritizes safety since Step S11 is the case where the pressure sensor has a failure in one location. Since the pressure sensor, which is provided in the location determined to have a failure, is not used thereafter, the active channel is fixed after selecting the active channel in Step S11 at the time of failure occurrence. Here, in Step S11, a preset active channel system may be continuously used without selecting the active channel.

The operations of the stall prediction apparatus STD is described above. The engine control unit ECU (the first engine controller 20 and the second engine controller 30) performs predetermined engine control for avoiding stall occurrence such as limiting fuel supply amount to the engine, reducing the exit pressure of the axial compressor by extracting steam, or the like, once the engine control unit ECU receives the active stall control start signal from the stall prediction apparatus STD. In the case where the engine control unit ECU receives the active stall control continuation signal, the engine control unit ECU continuously performs the active stall control. In the case where the engine control unit ECU receives the active stall control stop signal, the engine control unit ECU stops the active stall control and performs normal operation control. In the case where the engine control unit ECU receives the double failure alarm signal, the engine control unit ECU performs an emergency treatment such as stopping the engine immediately, treatments such as limiting the fuel supply amount to the level where the stall never occurs in the compressor, increasing the extraction amount of the steam, or the like. Since the engine control unit ECU constitutes the ½ stand-by redundancy system having two systems namely the first engine controller 20 and the second engine controller 30, one of the engine controller designated for the active system may be used for the engine control.

As described above, in accordance with the present embodiment, by excluding the time-wise fluctuations, the circumferential nonuniformity, and the influences of the individual differences in the stall risk index, it is possible to obtain highly accurate (supersensitive) and stable stall risk index which is necessary for the active stall control. By obtaining the highly accurate (supersensitive) and stable stall risk index, it is possible to improve the accuracy of fault diagnoses of the pressure sensors. Therefore, it is possible to perform a safe and highly reliable redundant control relative to the engine control system which is necessary for the active stall control.

The present invention is not limited to the above described embodiments but the following alternative examples can be considered.

(1) In the above embodiment, in the case where a single failure is determined to have occurred in Step S9 in FIG. 3, the average value of the stall risk indexes, which is obtained from the pressure sensors of other sensor setting locations excluding the pressure sensor of the α system and the β system corresponding to the sensor setting location where the failure is determined to have occurred, is calculated. But it is not limited thereto. The pressure sensor, which obtains substantially the same value compared with an estimated value from the stall risk indexes obtained from the pressure sensors provided in other sensor setting locations, may be determined as normal. On the other hand, the pressure sensor which obtains a different value compared with the estimated value from the stall risk indexes obtained from the pressure sensors provided in other locations may be determined as failure. Furthermore, the average value of the stall risk indexes obtained from the pressure sensor determined as normal in the sensor setting location which is determined as single failure, and the pressure sensors provided in the other sensor setting locations may be calculated.

In the sensor setting location which is determined as single failure, while the pressure sensor which obtains the maximum stall risk index may be determined to be normal, the other pressure sensor may be determined to be failure. Furthermore, the average value of the stall risk indexes obtained from the pressure sensor determined as normal in the sensor setting location, and the pressure sensors provided in the other sensor setting locations may be calculated.

(2) In the above embodiments, two pressure sensors are provided in each of the sensor setting locations; it is not limited thereto but two or more pressure sensors or one pressure sensor may be provided therein. In the case where one pressure sensor is provided in each of the sensor setting locations, it is not possible to perform fault diagnoses of the pressure sensors. However, by excluding the time-wise fluctuations, the circumferential nonuniformity, and the influences of the individual differences in the stall risk index, it is possible to obtain highly accurate (supersensitive) and stable stall risk index which is necessary for the active stall control. This is the same effect as in the above embodiments.

(3) The above embodiments were described in condition that the sensor setting locations are four, but it is not limited thereto. It is preferable to have more sensor setting locations since it is possible to effectively exclude the circumferential nonuniformity of the stall risk index with more sensor setting locations.

(4) In the above embodiments, ON/OFF signal of the active stall control start signal and the active stall control stop signal is output, but it is not limited thereto. A signal for modulation, which can be used in the engine controller, may be output from a correlation between the stall margin and the stall risk index. The signal for modulation may be described in the below equation (1), for example. Here, in the equation (1), ST stands for the stall risk index, L1 stands for the first threshold value, and L2 stands for the second threshold value.

$$\text{Signal for modulation} = (ST-L1)/(L2-L1) \qquad (1)$$

(5) The stall prediction apparatus in accordance with the present embodiment may be used as an engine health monitoring system for determining health condition of the axial compressor. For example, if the stall risk index exceeds a threshold value, the stall risk index may start to be recorded with the exceeding as a trigger, or an operation state of the engine may be recorded by sending the trigger to the engine controller too. Here, in the case where the stall prediction apparatus is used as the engine health monitoring system, the redundant control is not indispensable. In this case, one pressure sensor may be provided in each of the locations in the circumferential direction and the index calculator, signal processor, and the engine controller may have one system each.

(6) In the above embodiments, a technique disclosed in U.S. Pat. No. 6,715,984 B2 (Patent Document 1) is employed and the autocorrelation value of time-series data of the wall pressure is used as the stall risk index, but it is not limited thereto. The present invention may be applied to and effects can be obtained from any objects as long as the stall risk index thereof are provided with time-wise fluctuations or the circumferential nonuniformity. Accordingly, as the calculation method of the stall risk index, techniques disclosed in Japanese Unexamined Patent Application, First Publication No. 2004-124946 (Patent Document 2), Japanese Unexamined Patent Application, First Publication No. 2005-188514 (Patent Document 3), or the like may be employed too.

Industrial Applicability

In accordance with the present invention, by excluding the time-wise fluctuations and influence of the circumferential nonuniformity in the stall risk index, it is possible to obtain highly accurate (supersensitive) and stable stall risk index which is necessary for the active stall control. By obtaining the highly accurate (supersensitive) and stable stall risk index, it is possible to improve the accuracy of the fault diagnoses of the pressure sensors. Therefore, it is possible to realize a stable and highly reliable engine control system which is necessary for the active stall control.

What is claimed is:

1. A stall prediction apparatus of an axial compressor provided with a rotor having a plurality of rotor blades and a cylindrical casing facing the rotor blades and provided so as to cover the outer circumference of the rotor, the stall prediction apparatus comprising:

two or more pressure sensors provided at each of a plurality of locations in a circumferential direction of an inner wall surface of the casing;

an index calculator configured to calculate a stall risk index for evaluating a stall risk based on time-series data detected by each of the pressure sensors; and a signal processor configured to predict a stall occurrence based on the stall risk indexes obtained corresponding to each of the pressure sensors, wherein the signal processor determines if failure occurs in the pressure sensors provided at any of the plurality of locations based on the stall risk indexes obtained corresponding to the pressure sensors provided at said any of the plurality of locations, when a difference among the stall risk indexes obtained corresponding to the pressure sensors provided at said any of the plurality of locations exceeds a predetermined threshold value, the signal processor determines pressure sensors provided at said any of the plurality of locations which obtain substantially the same values compared with an estimated value from the stall risk indexes obtained from pressure sensors provided in other locations are normal, while the signal processor determines pressure sensors provided at said any of the plurality of locations which obtain values which are different from said estimated value are in the state of failure, and the signal processor predicts the stall occurrence based on an average value of the stall risk indexes obtained from the pressure sensors determined to be normal at said any of the plurality of locations and the pressure sensors provided in other locations.

2. A stall prediction apparatus of an axial compressor provided with a rotor having a plurality of rotor blades and a cylindrical casing facing the rotor blades and provided so as to cover the outer circumference of the rotor, the stall prediction apparatus comprising:

two or more pressure sensors provided at each of a plurality of locations in a circumferential direction of an inner wall surface of the casing;

an index calculator configured to calculate a stall risk index for evaluating a stall risk based on time-series data detected by each of the pressure sensors; and a signal processor configured to predict a stall occurrence based on the stall risk indexes obtained corresponding to each of the pressure sensors, wherein the signal processor determines if failure occurs in the pressure sensors provided at any of the plurality of locations based on the stall risk indexes obtained corresponding to the pressure sensors provided at said any of the plurality of locations, when a difference among the stall risk indexes obtained corresponding to the pressure sensors provided at said any of the plurality of locations exceeds a predetermined threshold value, the signal processor determines pressure sensors provided at said any of the plurality of locations which obtains the maximum stall risk indexes are normal, while the signal processor determines the other pressure sensors provided at said any of the plurality of locations are in the state of failure, and the signal processor predicts the stall occurrence based on an average value of the stall risk indexes obtained from the pressure sensors determined to be normal at said any of the plurality of locations and the pressure sensors provided in other locations.

3. A stall prediction apparatus of an axial compressor provided with a rotor having a plurality of rotor blades and a cylindrical casing facing the rotor blades and configured so as to cover the outer circumference of the rotor, the stall prediction apparatus comprising:

one or more pressure sensors provided at each of a plurality of locations in a circumferential direction of an inner wall surface of the casing;

an index calculator configured to calculate a stall risk index for evaluating a stall risk based on time-series data detected by each of the pressure sensors; and a signal processor configured to predict a stall occurrence based on the stall risk indexes obtained corresponding to each of the pressure sensors;

a rotating speed sensor positioned and configured to detect a rotating speed of the rotor; and a storage device configured to store specific bias values for correction of said each of the pressure sensors, the specific bias values being the differences between the stall risk indexes obtained corresponding to said each of the pressure sensors which are obtained in advance before operating the axial compressor and the average value of the stall risk indexes, and to store in advance a relationship between the rotating speed and a bias value for correction corresponding to each of the pressure sensors, wherein the signal processor corrects the stall risk index by subtracting the bias value for correction corresponding to the rotating speed in real operation based on the relationship between the rotating speed and the bias value for correction from the stall risk indexes obtained corresponding to said each of the pressure sensors.

\* \* \* \* \*